July 20, 1937.  J. DALL  2,087,535
STABILIZER
Filed April 9, 1936
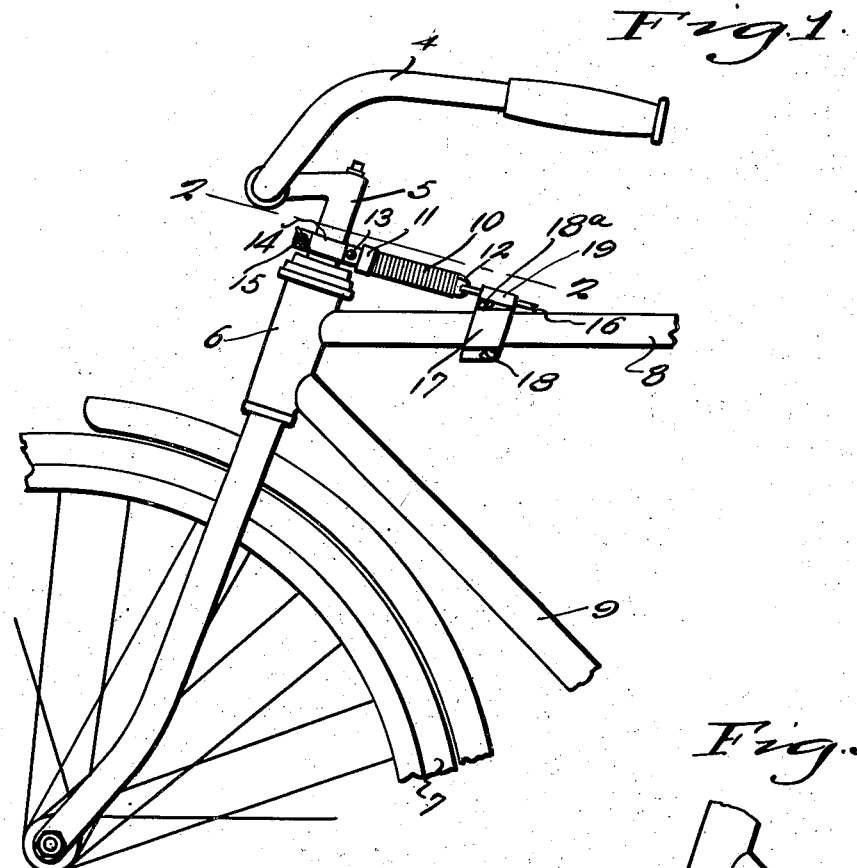
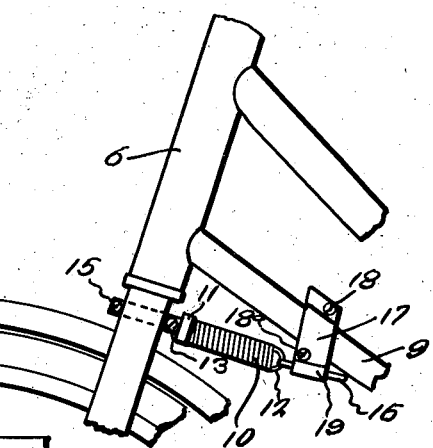
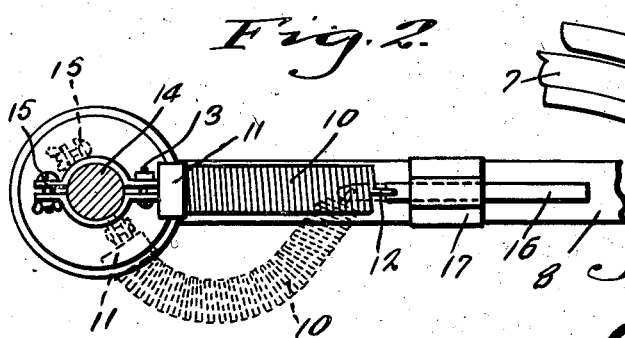
Inventor
John Dall
By Clarence A. O'Brien and
Hyman Berman
Attorneys Patented July 20, 1937

2,087,535

UNITED STATES PATENT OFFICE 2,087,535

STABILIZER

John Dall, Ventnor City, N. J.

Application April 9, 1936, Serial No. 73,536

1 Claim. (Cl. 208—136)

This invention relates to an improvement in stabilizers, and in particular to an improvement in stabilizers for bicycles.

The principal object of my invention is to provide for a bicycle a stabilizer by which the front wheel thereof will always have a tendency to remain in a straight line with the frame of the bicycle.

Another object resides in the provision of a stabilizer which will support a parked bicycle in an upright position for retaining the front wheel in alignment with the frame of said bicycle.

A further object is to provide a stabilizer which can easily be attached to the conventional make of bicycles, and which is simple in construction, inexpensive to manufacture and durable in use.

Other objects of my invention will be apparent from the following description of the present preferred form thereof, taken in connection with the accompanying drawing, wherein:

Figure 1 is a side view of the stabilizer attached to a conventional bicycle.

Figure 2 is a top plan view of the stabilizer attached to a conventional bicycle shown fragmentarily, the stabilizer also being shown by dotted lines in a distorted condition.

Figure 3 is a similar view to that of Figure 1 with the stabilizer attached to a conventional bicycle in a modified manner.

In the drawing, wherein for the purpose of illustration, is shown a preferred embodiment of my invention, there is shown a fragmentary view of a conventional bicycle having a pair of handlebars 4 secured to the handlebar stem 5, which is pivotally mounted in the sleeve 6 and which is attached to the fork member supporting the front wheel 7. The conventional longitudinal and diagonal bars 8 and 9, respectively, are secured to the sleeve 6.

My stabilizer comprises a longitudinal coil spring 10, which has one end provided with a collar 11, and the opposite end terminating in a hook 12. The collar 11 is secured by a bolt and nut 13 to a clamp 14, which is tightened about the handlebar stem 5 by an adjustable screw 15 to rigidly retain the spring in fixed position on said stem.

The hook end 12 of the spring is attached to a bolt 16 by passing the hook through an eye in the end of said bolt. Rigidly mounted on the longitudinal bar 8 is a shackle 17, which is held in place by screws 18 and 18ª or other suitable fastening means. In order to connect the handlebar stem 5 with the longitudinal bar 8 by means of the spring 10, a sleeve 19 is formed in one end of the shackle 17 to slidably receive the bolt 16. By permitting the bolt 16 to slide in the sleeve 19 of the shackle 17 instead of rigidly attaching the bolt to said shackle, the spring 10 will bend with only a slight expansion when the handlebar stem is turned. This is clearly shown in Figure 2. In this manner there is prevented a pull on the spring, and there is effected uniform resistance to the action of said spring. If more resistance against the turning of the handlebars is desired, the bolt 16 may be rigidly secured in the sleeve 19 by tightening the screw 18ª.

From the foregoing description it is apparent that I have provided a stabilizer, which will return the front wheel 7 to a straight position when the handlebars 4 are released.

In Figure 3 I have shown the stabilizer attached to the front wheel fork and the diagonal bar 9 of the bicycle frame.

It is to be understood that this form of my invention herein shown and described is to be taken as a preferred embodiment of the same, and that various changes in the shape, size and arrangement of parts may be made, without departing from the spirit of my invention, or the scope of the appended claim. It is to be further understood that the use of my invention is not to be limited to bicycles, but may be applied to airplane controls, a steering gear for a vehicle, a swinging door and similar devices.

Having described my invention, what is claimed is:

A stabilizer of the class described comprising a resilient member, a clamp secured to one end of said member, a bolt secured to the other end of the member, a shackle, and a sleeve formed in said shackle for slidably receiving the bolt to reduce the expansion of the resilient member when said member is distorted.

JOHN DALL.